Nov. 6, 1956  J. A. NORTHCOTE  2,769,295
HITCH DEVICE FOR TRACTOR DRAWN AGRICULTURAL IMPLEMENT
Filed April 8, 1955
FIG. 1
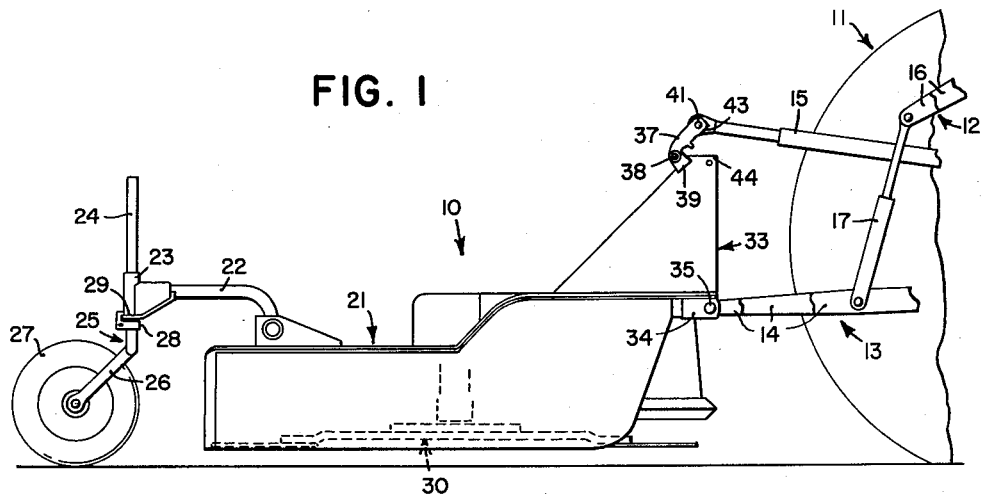
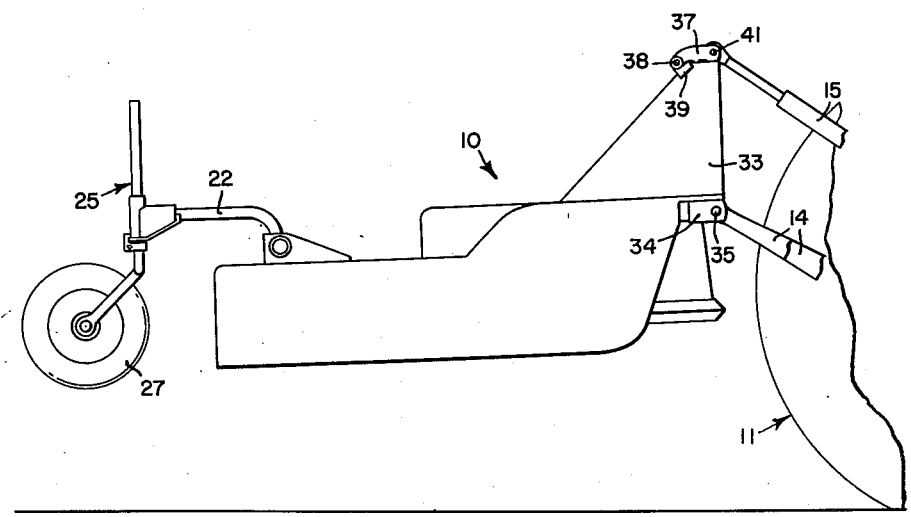
FIG. 2
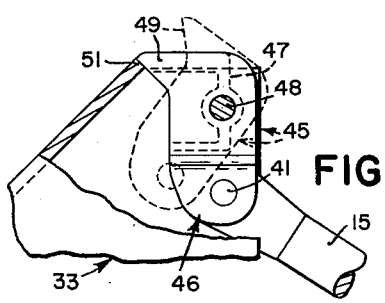
FIG. 3
INVENTOR.
JOHN A. NORTHCOTE
BY
ATTORNEYS United States Patent Office 2,769,295
Patented Nov. 6, 1956

2,769,295

HITCH DEVICE FOR TRACTOR DRAWN AGRICULTURAL IMPLEMENT

John A. Northcote, Welland, Ontario, Canada, assignor to John Deere Plow Company (Limited), Welland, Ontario, Canada, a corporation of Canada Application April 8, 1955, Serial No. 500,252

5 Claims. (Cl. 56—25.4)

The present invention relates generally to agricultural implements and more particularly to hitch devices for implements that, in operation, are supported, at least in part, on the ground but when arranged for transport are supported substantially entirely on the propelling tractor to which the implement is connected.

The object and general nature of the present invention is the provision of a new and improved hitch arrangement whereby an implement, such as a rotary mower or the like, having a rear ground-engaging wheel for supporting at least partially the weight of the rear portion of the implement is connected with a propelling tractor having a power lift system whereby the implement may be raised by the power lift of the tractor into a tractor-carried transport position, but when in operation the implement is free to float generally vertically relative to the tractor, whereby the outfit as a whole may negotiate uneven ground surfaces without causing undesirable variations in the position of the implement, particularly the operating unit thereof, such as the rotary cutter in the case of a mower, relative to the ground or to the crop handled by the implement.

More specifically, it is a feature of this invention to provide an implement particularly adapted to be connected to a tractor having a three-point hitch arrangement, the implement being constructed and arranged so that the rear end of the implement may be carried on a ground wheel or the like, while the front portion of the implement is carried on the tractor power lift actuated draft links, with a connection between the implement and the upper or thrust link of the three-point hitch system so arranged that the upper portion of the implement is free to move toward and away from the tractor during normal operation, as may be required as when passing over ridges, through swales or the like, yet when the implement is to be transported, the operation of the tractor power lift to carry the weight of the implement entirely on the tractor is not effected. Particularly, the implement is provided with an upper connection adapted to receive the rear end of the upper thrust or compression link of a tractor having a three-linkage system, the link being pivoted to the rear end of the thrust link and arranged so that in normal operation the arm and link constitute a lost-motion or floating connection, permitting the upper portion of the implement to move toward or away from the tractor with relative freedom of action, but when the tractor power lift is operated to raise the implement, the arm and link are tightened and act to carry a portion of the weight of the implement in transport, with the ground wheel entirely off the surface of the ground during transport. A further feature of the invention in this connection is the provision of stop means acting between the implement and the pivoted arm thereon that receives the thrust link of the tractor, whereby the parts are maintained in the position such that they can buckle, or otherwise be reduced in over-all effective length, when, in operation, the rear end of the implement may be raised relative to the tractor, or the front end of the tractor tipped upwardly relative to the implement, as will occur when the front end of the tractor passes up a rise or the like.

These and other objects and advantages of the present invention will be apparent to those skilled in the art after a consideration of the following detailed description of the preferred embodiment, taken in conjunction with the accompanying drawings, in which:

Fig. 1 is a side view of a rotary mower in which the principles of the present invention have been incorporated, the mower being shown as connected in operating position to a propelling tractor.

Fig. 2 is a view similar to Fig. 1, illustrating the raised or transport position of the implement.

Fig. 3 is an enlarged fragmentary side view of a modified form of the present invention whereby a limited amount of movement of the implement relative to the tractor is accommodated.

Referring now to the drawings, particularly Fig. 1, the reference numeral 10 indicates a rotary mower of the type particularly adapted to be connected to a tractor 11 having a power lift system 12 and hitch structure 13, the latter including a pair of lower tension links 14 and an upper compression link 15, the upper and lower links being pivotally connected to the tractor 11 for both vertical and generally lateral swinging. The tractor power lift system 12 includes a pair of lift arms 16 actuated by power derived from the tractor motor and connected by a lift link 17 with the two lower tension links or draft links 14. Normally, as when in operating position, the upper and lower links 14 and 15 extend divergingly rearwardly and are adapted to receive any one of a number of different implements adapted to be operated by and/or carried on the tractor. A tractor and hitch system of this kind are well known and further description is believed to be unnecessary.

The rotary mower 10 of the present invention comprises a generally horizontal framework 21 carrying at its rear portion a rearwardly extending bracket 22 having at its rear end a vertical sleeve structure 23 in which the spindle 24 of a rear castering wheel axle 25 is disposed. The axle 25 includes a downwardly and rearwardly extending section 26 to which a rear ground wheel 27 is journaled. An adjustable set screw collar 28 cooperating with a flange 29 on the rear bracket structure 23 serves to maintain the castering wheel axle 25 in different positions of vertical adjustment relative to the bracket 22 and the main frame 21 of the mower. The latter includes a horizontally rotatable cutter or rotor 30 driven by the power lift of the tractor in any suitable way, not necessary to describe here. For best operation, it is desirable to maintain the horizontally movable cutter 30 in a nearly horizontal position, or a position parallel to the ground surface, at all times.

The frame structure 21 of the mower 10 includes a vertically extending hitch frame structure 33 that forms a more or less integral part of the mower and is provided with a pair of lower brackets 34 to each of which a laterally outwardly extending stud 35 is rigidly connected. These studs 35 form means pivotally receiving the rear end of the lower draft links 14 of the tractor.

For receiving the rear end of the upper thrust or compression link 15 of the tractor, there is provided, according to the principles of the present invention, a swingable arm 37 pivotally connected, at 38, with a bracket 39 that is fixed to the upper forward portion of the hitch frame structure 33. The forward end of the arm 37 is apertured to receive pivot means 41 by which the rear end portion of the upper thrust or compression link 15 is connected with the arm 37. An abutment 43 is formed on the lower forward end of the arm 37 and cooperates with an adjacent portion 44 of the hitch structure 33, thereby serving as a stop to limit the downward swinging of the arm 37. This is for a purpose that will appear later.

The operation of the implement of the present invention will now be described.

Fig. 1 shows the mower 10 connected with the tractor 11 in the operating position. The weight of the rear portion of the implement is supported on the wheel 27 and the weight of the forward portion of the mower 10 is carried through the draft links 14 and lift links 17 on the lift arms 16 of the tractor, these parts being hydraulically locked against downward movement. Since the rear castering wheel 27 carries only about half the weight of the implement, this wheel may be made relatively inexpensive and appreciably lighter than would be the case if the wheel 27 were required to support the entire weight of the implement.

When the front end of the tractor tips upwardly relative to the implement 10, or the rear end of the implement 10 swings upwardly relative to the tractor, such relative movement is permitted by the free action of the articulated arm and link structure that includes the thrust link 15 and the upwardly swingable arm 37. The latter is so constructed and arranged that, in normal operation, the arm 37 extends upwardly and forwardly at a relatively sharp angle with respect to the link 15, with considerable space between the arm abutment 43 and the hitch frame abutment 44. Thus, the rear end of the implement may swing either upwardly or downwardly from its normal position relative to the tractor, as shown in Fig. 1, through considerable distances. Therefore, while the weight of the front portion of the implement is carried on the draft links 14 and associated parts, the rear end of the implement is free to swing upwardly or downwardly, as when the outfit travels through swales, over ridges, uneven ground or the like, and in substantially all positions, the rotor 29 is maintained substantially parallel relative to the ground surface.

When it is desired to transport the implement from place to place, this is done by actuating the tractor power lift structure 12 so as to raise the arms 16. The upward movement of these parts acts through the lift links 17 and the draft links 14 to raise the front end of the implement. This movement first raises the implement relative to the rear ground wheel 27, but just as soon as the arm 37 is brought down to engage the abutment 44, further tilting of the implement about the rear ground wheel 27 is limited, and then continued upward swinging of the lift arms 16 raises the implement 10 bodily off the ground, the implement, including the rear wheel 27 and associated parts, being entirely supported on the tractor 11. It will thus be seen that by properly proportioning the link 37 and associated parts, the desired freedom of movement of the implement when in operating position relative to the tractor is provided for, yet the implement may be entirely supported on the tractor by actuating the power lift system of the latter so as to raise all parts of the implement off the ground.

It will be seen from Fig. 2 that when the implement as shown in this figure is raised, the upper link is downwardly and forwardly at a considerable angle relative to the horizontal. Under certain conditions and/or with certain tractors, this may impose undesirable loads on the tractor and it would for that reason be desirable to reduce the angularity of the upper link so as to have the latter lie more nearly horizontal than is shown in Fig 2, for example. To accommodate situations of this kind, I provide the modified form of connection between the top link and the upper portion of the associated implement, shown in Fig. 3.

In Fig. 3, the floating link that connects the rear end of the upper link 15 with the upper portion of the implement hitch frame structure 33 is shown as an arm 45, preferably formed as a casting and having a lower bifurcated section 46 pivotally connected, as by the pin 41, with the rear end of the upper link 15. The casting member 45 also includes an upper bearing section 47 that is rockably disposed on a pivot pin 48 carried at the upper portion of the hitch structure 33. The member 45 has an abutment or nose section 49 that bears against a companion abutment section 51 on the upper portion of the hitch frame structure 33 when the implement is raised off the ground in substantially the position shown in Fig. 2. When the implement is in working position, corresponding to the position shown in Fig. 1, the floating arm or link member 45 is displaced generally rearwardly, as shown in dotted lines in Fig. 3, this construction providing for the desired up and down movement of the rear portion of the implement when in operating position. This floating action of the member 45 is substantially identical in principle with the floating movement of the swingable arm 37 described above.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What is claimed is:

1. The combination with a tractor having an upper rearwardly extending rigid compression link pivoted at its front end to the tractor, a pair of laterally spaced apart lower rearwardly extending draft-transmitting links, and means connected with said pair of links to raise and lower the rear ends thereof, of a rotary mower comprising a horizontally movable cutter, frame means therefor including a pair of laterally spaced apart means at the forward part of the frame means pivotally receiving the rear ends of said draft-transmitting links, whereby the forward part of the frame means is supported through said pair of links and the associated tractor, means including a rear ground-engaging means to support the rear part of said mower frame means, and an upper link-receiving means carried by said mower frame means substantially directly above said pair of spaced apart link-receiving means and comprising a floating link pivoted to an upper forward part of said implement frame means and having relatively free and unrestrained movement within limits with respect to both said implement frame means and said compression link, means at the forward end of said floating link pivotally receiving the rear end of said compression link, and stop means acting to define the aforesaid limits of swinging of said floating link relative to said compression link and to limit said floating movement beyond a given point, whereby tensile forces may be transmitted between the tractor and the upper portion of said mower frame means.

2. For use with a tractor having an upper rearwardly extending rigid compression link pivoted at its front end to the tractor, a pair of laterally spaced apart lower rearwardly extending draft-transmitting links, and means connected with said pair of links to raise and lower the rear ends thereof, the improvement comprising a rotary mower comprising a horizontally movable cutter, frame means therefor including a pair of laterally spaced apart means at the forward part of the frame means to receive the rear ends of said draft-transmitting links, whereby the forward part of the frame means is adapted to be supported through said pair of links and the associated tractor, means including a rear ground-engaging means to support the rear part of said mower frame means, and an upper link-receiving means carried by said mower frame means substantially directly above said pair of spaced apart link-receiving means and comprising a relatively freely movable floating link pivoted at its rear end to an upper forward part of said implement frame means, means at the forward end of said floating link to pivotally receive the rear end of said compression link, and stop means acting to accommodate a limited amount of swinging of said floating link relative to said compression link but to limit said floating movement beyond a given point, whereby tensile forces may be transmitted between the tractor and the upper portion of said mower frame means.

3. An agricultural implement adapted to be connected with a tractor having a pair of lower laterally spaced apart draft links and a centrally disposed upper thrust link, said implement comprising frame means including a forward generally vertically disposed hitch frame structure, a pair of lower laterally spaced apart draft link-receiving means, an upper generally centrally disposed thrust link-receiving means comprising a generally fore-and-aft extending freely swingable arm pivoted with the upper portion of said hitch frame structure and extending generally upwardly and forwardly therefrom, pivot means at the front end of said arm to receive the rear end of said upper thrust link, and stop means acting between said arm and said hitch structure so as to accommodate a limited amount of swinging of said floating link relative to said compression link but to limit said floating movement beyond a given point, whereby tensile forces may be transmitted between the tractor and the upper portion of said mower frame means.

4. An agricultural implement adapted to be connected with a tractor having a pair of lower laterally spaced apart draft links and a centrally disposed upper thrust link, said implement comprising frame means, a pair of lower laterally spaced apart draft link-receiving means carried by said frame means, an upper generally centrally disposed thrust link-receiving means carried by said frame means, comprising a generally fore-and-aft extending freely swingable arm pivoted at its rear end with said frame means above said lower link-receiving means and extending generally upwardly and forwardly therefrom, pivot means at the front end of said arm to receive the rear end of said upper thrust link, stop means acting between said arm and said hitch structure so as to prevent downward swinging of said link beyond a point just above a straight line joining the pivot of said arms with the frame means and the point of pivotal connection of said thrust link with the tractor, and ground-engaging means supporting at least the rear portion of the weight of said frame means, said upper thrust link and said arm buckling upwardly when uneven ground acts to raise the implement relative to the tractor.

5. An agricultural implement adapted to be connected with a tractor having a pair of lower laterally spaced apart draft links and a centrally disposed upper thrust link, said implement comprising frame means, a pair of lower laterally spaced apart draft link-receiving means carried by said frame means above said lower link-receiving means thrust link-receiving means carried by said frame means, comprising a freely swingable connecting arm pivoted to said frame means above said lower link-receiving means and extending generally downwardly from said frame means, pivot means at the lower end of said arm to receive the rear end of said upper thrust link, stop means acting between said arm and said hitch structure so as to prevent upward swinging of said link beyond a point below a straight line joining the pivot of said arm with the frame means and the point of pivotal connection of said thrust link with the tractor, and ground-engaging means supporting at least the rear portion of the weight of said frame means, said upper thrust link and said arm buckling downwardly when uneven ground acts to raise the implement relative to the tractor.

References Cited in the file of this patent
UNITED STATES PATENTS

| | | |
|---|---|---|
| 2,576,886 | McCoy | Nov. 27, 1951 |
| 2,596,579 | McKay | May 13, 1952 |
| 2,645,890 | Spedding | July 21, 1953 |